United States Patent [19]
Kada et al.

[11] Patent Number: 5,954,152
[45] Date of Patent: Sep. 21, 1999

[54] POWER STEERING DEVICE

[75] Inventors: Tomoyasu Kada, Kaizuka; Shiro Nakano, Osaka; Isao Kuramoto, Sayama, all of Japan

[73] Assignee: Koyo Seiko Co., Ltd., Osaka, Japan

[21] Appl. No.: 08/733,644

[22] Filed: Oct. 17, 1996

[30] Foreign Application Priority Data

Oct. 25, 1995 [JP] Japan .................................... 7-302201
Apr. 24, 1996 [JP] Japan .................................... 8-129060

[51] Int. Cl.$^6$ ...................................................... B62D 5/06
[52] U.S. Cl. ............................................. 180/422; 701/42
[58] Field of Search ................................... 180/417, 421, 180/422, 446, 423; 701/42

[56] References Cited

U.S. PATENT DOCUMENTS

| | | | |
|---|---|---|---|
| 4,392,540 | 7/1983 | Michio et al. | 180/422 |
| 4,552,240 | 11/1985 | Takeshima et al. | 180/422 |
| 4,557,343 | 12/1985 | Pickering | 180/422 |
| 4,730,686 | 3/1988 | Shimuzi | 180/446 |
| 5,505,275 | 4/1996 | Phillips | 180/417 |
| 5,641,033 | 6/1997 | Langkamp | 180/422 |

FOREIGN PATENT DOCUMENTS

| | | |
|---|---|---|
| 0534332 | 3/1993 | European Pat. Off. . |
| 4409928 | 9/1995 | Germany . |
| 5-270425 | 10/1993 | Japan . |
| 5-270427 | 10/1993 | Japan . |
| 8-145830 | 6/1996 | Japan . |
| WO 93/00513 | 1/1993 | WIPO . |
| WO 93/22180 | 11/1993 | WIPO . |
| WO 95/04219 | 2/1995 | WIPO . |

*Primary Examiner*—Lanna Mai
*Assistant Examiner*—Avraham H. Lerner
*Attorney, Agent, or Firm*—Thelen Reid & Priest, LLP

[57] ABSTRACT

A power steering device has a hydraulic actuator that generates steering assistance power by using hydraulic fluid fed from a pump driven by a brushless electric motor. The device controls the motor's rotation speed to have a preset steering assistance speed in a steering assistance mode, and a preset standby speed in a steering assistance release mode. The motor rotation speed is set to the steering assistance speed after being set to a maximum speed that exceeds the steering assistance speed in the steering assistance mode.

21 Claims, 10 Drawing Sheets

Fig. 6 (1)
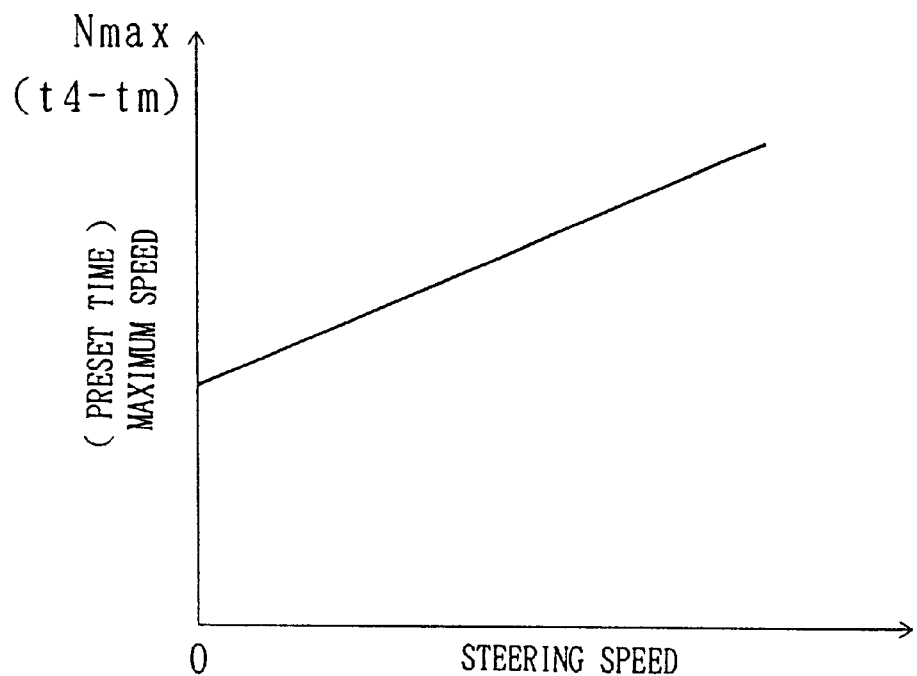
Fig. 6 (2)
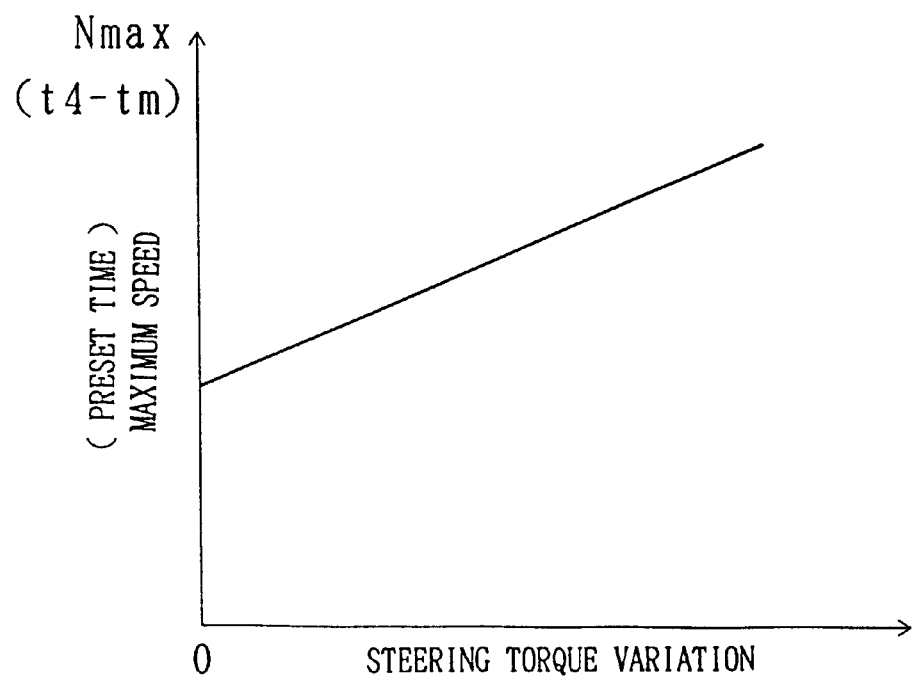

Fig. 8 (1)
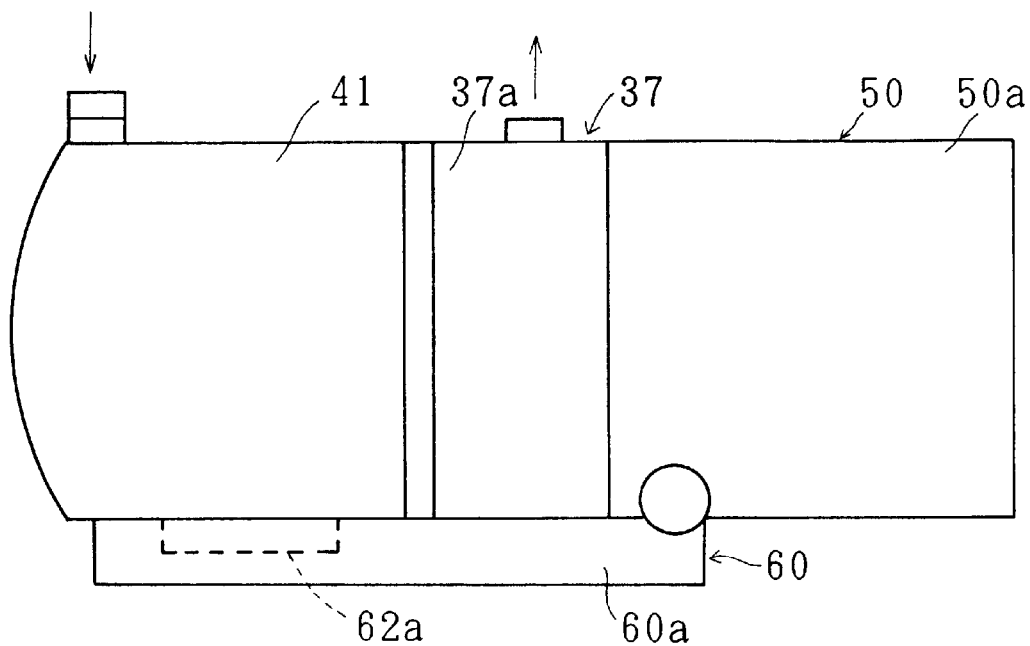
Fig. 8 (2)
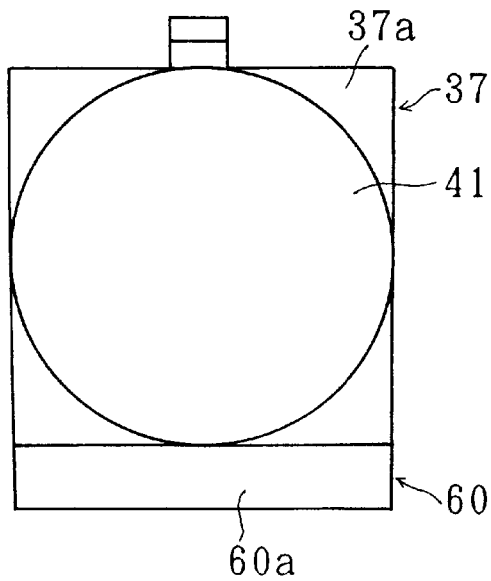

POWER STEERING DEVICE

FIELD OF THE INVENTION

The present invention relates to a power steering device, which generates steering assistance power by using hydraulic fluid fed from a pump driven by an electric actuator.

DESCRIPTION OF RELATED ART

A conventional power steering device comprises a pump driven by a DC motor having a brush and a hydraulic actuator generating steering assistance power by using hydraulic fluid fed from the pump. When the rotation speed of the DC motor having a brush is always kept at a value required to generate steering assistance power, the energy of the battery, which serves as the power source of the DC motor having a brush, is wasted.

To cope with this problem, the conventional power steering device is designed so that the rotation speed of the DC motor having a brush is set to a steering assistance speed at a steering assistance mode and set to a standby speed at a steering assistance release mode, whereby vehicle fuel consumption is improved.

However, when a pump is driven by a DC motor having a brush, failures can occur due to abrasion of the brush during long-term use.

Furthermore, when the standby speed is set to a low level in the conventional constitution, the time required for the change from the standby speed to the steering assistance speed is elongated, resulting in the delay of the steering assistance and the deterioration of the steering feeling. For this reason, it has been impossible to set the standby speed to a low level, so that satisfactorily improvement of the vehicle fuel consumption can not be achieved.

A prior art technology has been proposed in which an accumulator is provided in the hydraulic system so as to ensure the supply of hydraulic fluid for the steering assistance even when the time required for the change from the standby speed to the steering assistance speed is long. However, it costs because of the increased complexity of the hydraulic system.

The object of the present invention is to provide a power steering device free from the above-described problems.

SUMMARY OF THE INVENTION

The present invention is applied to a power steering device having a hydraulic actuator, which generates steering assistance power by using hydraulic fluid fed from a pump driven by an electric motor; and means for controlling the rotation speed of the motor so that the rotation speed is set to a steering assistance speed at a steering assistance mode and set to a standby speed at a steering assistance release mode.

By the use of a brushless motor as the pump-driving motor, failures due to brush abrasion can be prevented. When the standby speed is zero or low, the time required for the change from the standby speed to the steering assistance speed is influenced by the magnitude of the inertial moment of the motor rotor. It is therefore possible to shorten the time required for the change from the standby speed to the steering assistance speed when a brushless motor is used as the pump-driving motor than when a DC motor having a brush is used. Consequently, the delay of the steering assistance and the deterioration of the steering feeling can be prevented and vehicle fuel consumption can be improved satisfactorily.

It is preferable that the rotation speed of the pump-driving motor is set to the steering assistance speed after being set to a maximum speed exceeding the steering assistance speed at the steering assistance mode. By this constitution, the delay of the steering assistance and the deterioration of the steering feeling can be prevented, because the time required for increasing the flow rate of the hydraulic fluid fed from the pump to a value enough to generate steering assistance power is shortened. Also, because the rotation speed is decreased to a steering assistance speed after being maximized, the flow rate of the hydraulic fluid for steering assistance does not increase in excess, whereby vehicle fuel consumption can be improved.

It is preferable that the power steering device of the present invention has means for determining a steering speed or steering torque variation, and means for changing the maximum speed according to the steering speed or steering torque variation. More preferably, the power steering device of the present invention has means for changing the time required for decreasing the rotation speed of the motor from the maximum speed to the steering assistance speed according to the steering speed or steering torque variation. By this constitution, the delay of the steering assistance and the deterioration of the steering feeling can be prevented, because the time required for increasing the flow rate of the hydraulic fluid fed from the pump to a value enough to generate steering assistance power can be shortened when the steering speed or the steering torque variation is large, i.e., when quick steering is performed. When the steering speed or steering torque variation is small, the vehicle fuel consumption can be improved because the flow rate of the hydraulic fluid for steering assistance does not increase in excess.

It is preferable that the pump is a gear pump. This is because the time for increasing the flow rate of the hydraulic fluid fed from the gear pump to a value enough to generate steering assistance power is shortened. For example, in the case of a vane pump, hydraulic fluid is not discharged until the vanes for discharging hydraulic fluid is displaced radially outwardly by a centrifugal force after the driving shaft is driven by a motor. In contrast, in the case of a gear pump, hydraulic fluid is discharged upon driving of the driving shaft by a motor, because the gears for discharging hydraulic fluid is rotated simultaneously with the driving of the shaft. Therefore, the delay of the steering assistance and the deterioration of the steering feeling can be prevented. Also, in the case of a vane pump, the time required for displacing the vanes for discharging hydraulic fluid radially outwardly is elongated at low temperatures than at ordinary temperatures, because of increased viscous resistance of oil at low temperatures. In contrast, in the case of a gear pump, the delay of the steering assistance and the deterioration of the steering feeling can be prevented, because the discharge of the hydraulic fluid is not delayed due to low temperatures.

It is preferable that the power steering device of the present invention has means for decreasing the steering assistance speed of the motor according to the increase of the vehicle speed, and means for decreasing the maximum speed of the motor according to the increase of the vehicle speed. By this constitution, vehicle fuel consumption can be improved, because the maximum speed of the motor can be as low as possible when it is intended to improve the vehicle's maneuverability at low vehicle speeds and to improve the vehicle's running stability at high vehicle speeds.

According to the power steering device of the present invention, life span can be extended without maintenance by preventing failures due to brush abrasion, the delay of the steering assistance and the deterioration of the steering feeling can be prevented without increase of cost, and the vehicle fuel consumption can be improved satisfactorily.

BRIEF DESCRIPTION OF THE DRAWINGS

FIG. 6 (1) is a graph showing the relation between the maximum speed and steering speed in the brushless motor and also the relation between the preset time required for the change from the maximum speed to the steering assistance speed and steering speed in the power steering device of the embodiment of the present invention.

FIG. 6 (2) is a graph showing the relation between the maximum speed and steering torque variation in the brushless motor and also the relation between the preset time required for the change from the maximum speed to the steering assistance speed and steering torque variation in the power steering device of the embodiment of the present invention.

FIG. 8 (1) is a side view of the pump, tank, motor and controller of the power steering device of the embodiment of the present invention.

FIG. 8 (2) is a front view of FIG. 8 (1).

DETAILED DESCRIPTION OF PREFERRED EMBODIMENTS

There follows a description of an embodiment of the present invention by reference to Figures.

Figure 1:
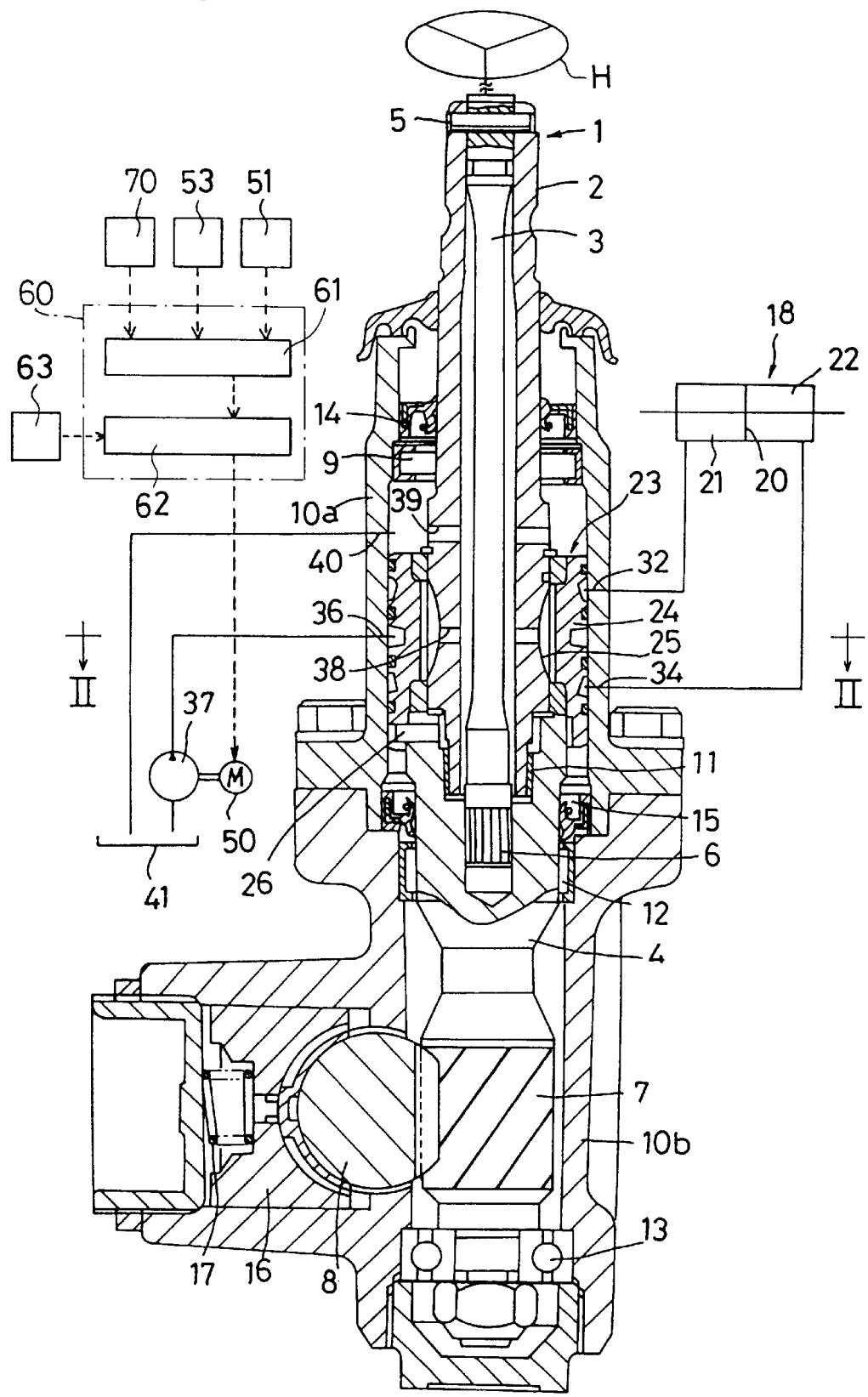
FIG. 1 is a longitudinal cross-sectional view of the power steering device of an embodiment of the present invention.

The rack and pinion type hydraulic power steering device 1 shown in FIG. 1 incorporates an input shaft 2 connected to a steering wheel H and an output shaft 4 connected to the input shaft 2 via a torsion bar 3. The torsion bar 3 is connected to the input shaft 2 by a pin 5 and also connected to the output shaft 4 by serrations 6. A pinion 7 is formed on the output shaft 4. The ends of a rack 8, which meshes with the pinion 7, are connected to the wheels (omitted from the drawing) to be steered. The input shaft 2 is supported by a valve housing 10a via a bearing 9 and by the output shaft 4 via a bush 11. The output shaft 4 is supported by a rack housing 10b via two bearings 12, 13. By this constitution, rotation of the input shaft 2 caused by steering is transmitted to the pinion 7 via the torsion bar 3. Rotation of the pinion 7 causes the rack 8 to move in right and left direction of the vehicle. This movement of the rack 8 causes the wheels to turn. Oil seals 14, 15 are introduced between the input and output shafts 2, 4 and the valve housing 10a. The rack 8 is supported by a support yoke 16 which is pressed against the rack 8 by elastic force of a spring 17.

A hydraulic cylinder 18 is provided to serve as a hydraulic actuator for generating steering assistance power. The hydraulic cylinder 18 incorporates a cylinder tube made up of the rack housing 10b, a piston 20 which is integrated with the rack 8, and a pair of hydraulic fluid chamber 21, 22. The hydraulic fluid chambers 21,22 are connected to a rotary type hydraulic control valve 23. The control valve 23 incorporates a cylinder shaped first valve member 24 and a second valve member 25, which is inserted in the first valve member 24 so as to be able to rotate relative to the first valve member 24. The first valve member 24 is fitted to the output shaft 4 by a pin 26 so as to be able to rotate together with the output shaft 4. The second valve member 25 is formed as an integral part of the outer circumference of the input shaft 2.

Figure 2:
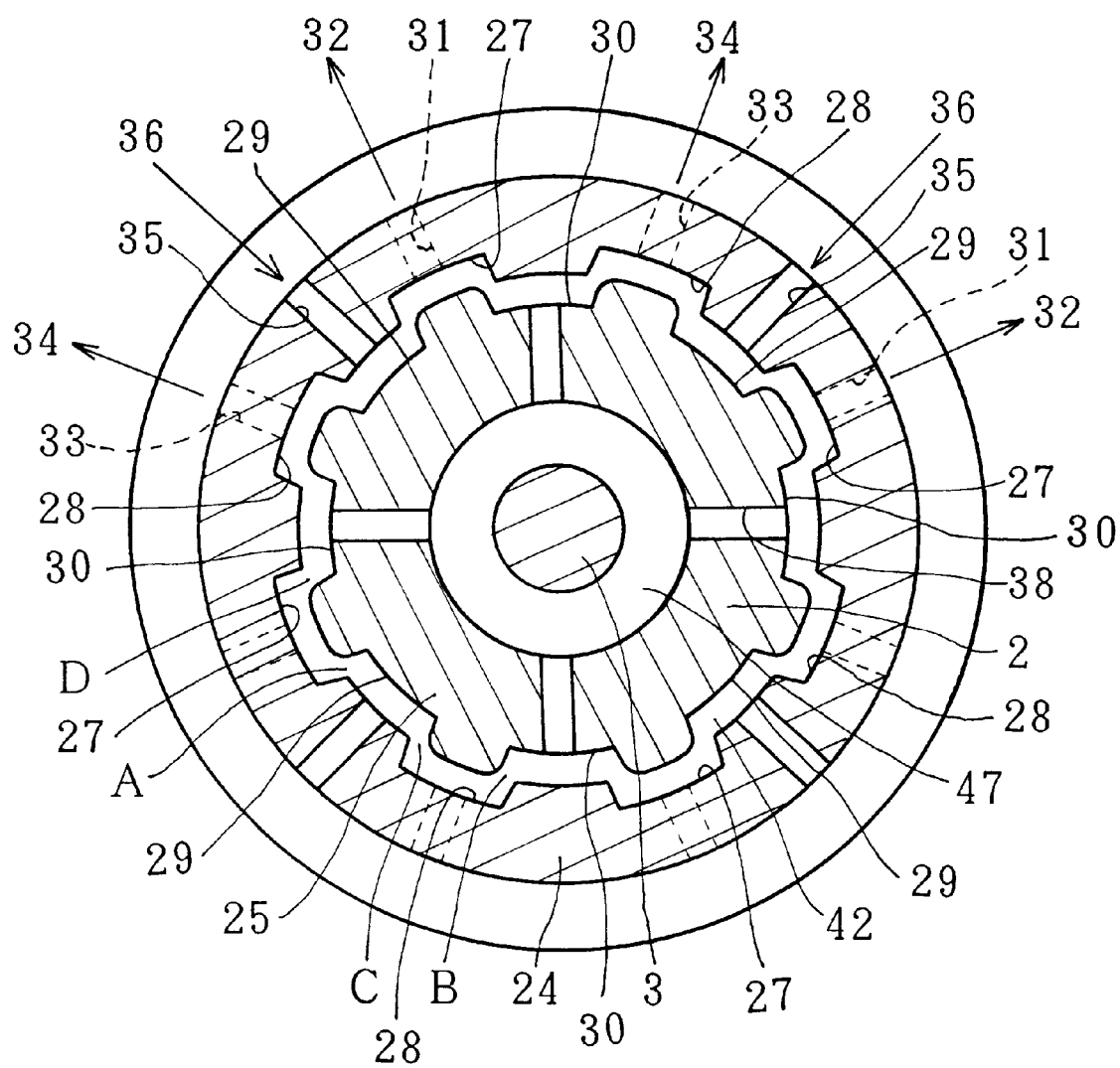
FIG. 2 is a cross-sectional view of FIG. 1 along the I—II line.

As shown in FIG. 2, a plurality of axially oriented slots are formed at intervals around the inner circumference of the first valve member 24 and the outer circumference of the second valve member 25.

The slots around the inner circumference of the first valve member 24 comprise four equally spaced right steering slots 27 and four equally spaced left steering slots 28.

The slots around the outer circumference of the second valve member comprise four equally spaced hydraulic fluid feed slots 29 and four equally spaced hydraulic fluid drainage slots 30.

The right steering slots 27 and the left steering slots 28 are positioned alternately around the inner circumference of the first valve member 24.

The hydraulic fluid feed slots 29 and the hydraulic fluid drainage slots 30 are positioned alternately around the inner circumference of the second valve member 25.

Each of the right steering slots 27 communicate with the one hydraulic fluid chamber 21 by way of first flow channels 31 formed in the first valve member 24, and a first port 32 formed in the valve housing 10a as shown in FIG. 1. Each of the left steering slots 28 communicate with the other hydraulic fluid chamber 22 by way of second flow channels 33 formed in the first valve member 24, and a second port 34 formed in the valve housing 10a.

The hydraulic fluid feed slots 29 communicate with a pump 37 as shown in FIG. 1 by way of third flow channels 35 formed in the first valve member 24, and an intake port 36 formed in the valve housing 10a. The pump 37 is driven by a brushless motor 50. The pump 37 can, for example, be a vane pump or gear pump, which discharges hydraulic fluid at a flow rate according to the rotation speed of the motor 50.

The hydraulic fluid drainage slots 30 communicate with a tank 41 by way of first drainage channels 38 formed in the second valve member 25, channels 47 defined by the gap between the inner circumference of the input shaft 2 and the outer circumference of the torsion bar 3, second drainage channels 39 formed in the input shaft 2 as shown in FIG. 1, and a drainage ports 40 formed in the valve housing 10a.

The pump 37, the tank 41 and the two hydraulic fluid chambers 21, 22 are thus communicated with each other through the internal flow channel 42 formed between the inner circumference of the first valve member 24 and the outer circumference of the second valve member 25.

In the internal flow channel 42, the gaps between the slots of the first valve member and the slots of the second valve member form throttling areas A, B, C and D. The gap size, that is, the opening of the throttling areas A, B, C and D can be varied by rotating the first and second valve members 24, 25 relative to each other. The pressure of the hydraulic fluid acting on the hydraulic cylinder 18 is varied by varying the opening of the throttling areas A, B, C and D.

FIG. 2 shows the relative positions of the first and second valve members 24,25 when the vehicle is on a straight course and steering is not being performed. In this condition, the hydraulic fluid feed slots 29 and the hydraulic fluid drainage slots 30 are communicated to each other by way of fully opened throttling areas A, B, C and D, so that the hydraulic fluid fed from the pump 37 is drained straight back into the tank 41. There is thus no steering assistance power.

If the driver then steers the vehicle away from its straight course to the right, the torsion bar 3 is twisted according to the steering torque corresponding to the strength of the driver's steering effort. This twisting motion in turn causes the two valve members 24,25 to rotate relative to each other. As a result, there is an increase in the opening of the throttling areas A between the right steering slots 27 and the hydraulic fluid feed slots 29 and the opening of the throttling areas B between the left steering slots 28 and the hydraulic fluid drainage slots 30, and there is a decrease in the opening of the throttling areas C between the left steering slots 28 and the hydraulic fluid feed slots 29 and the opening of the throttling areas D between the right steering slots 27 and the hydraulic fluid drainage slots 30. Thus, hydraulic fluid is fed from the pump 37 into the one hydraulic fluid chamber 21 and also hydraulic fluid is drained back from the other hydraulic fluid chamber 22 into the tank 41. As a result, steering assistance power to assist the steering of the vehicle to the right is applied to the rack 8.

If the driver steers the vehicle away from a straight course to the left, the variation of the opening of the throttling areas A, B, C and D is opposite to the variation in the case wherein the vehicle is steered to the right. Thus, steering assistance power to assist the steering of the vehicle to the left is applied to the rack 8.

Figure 3:
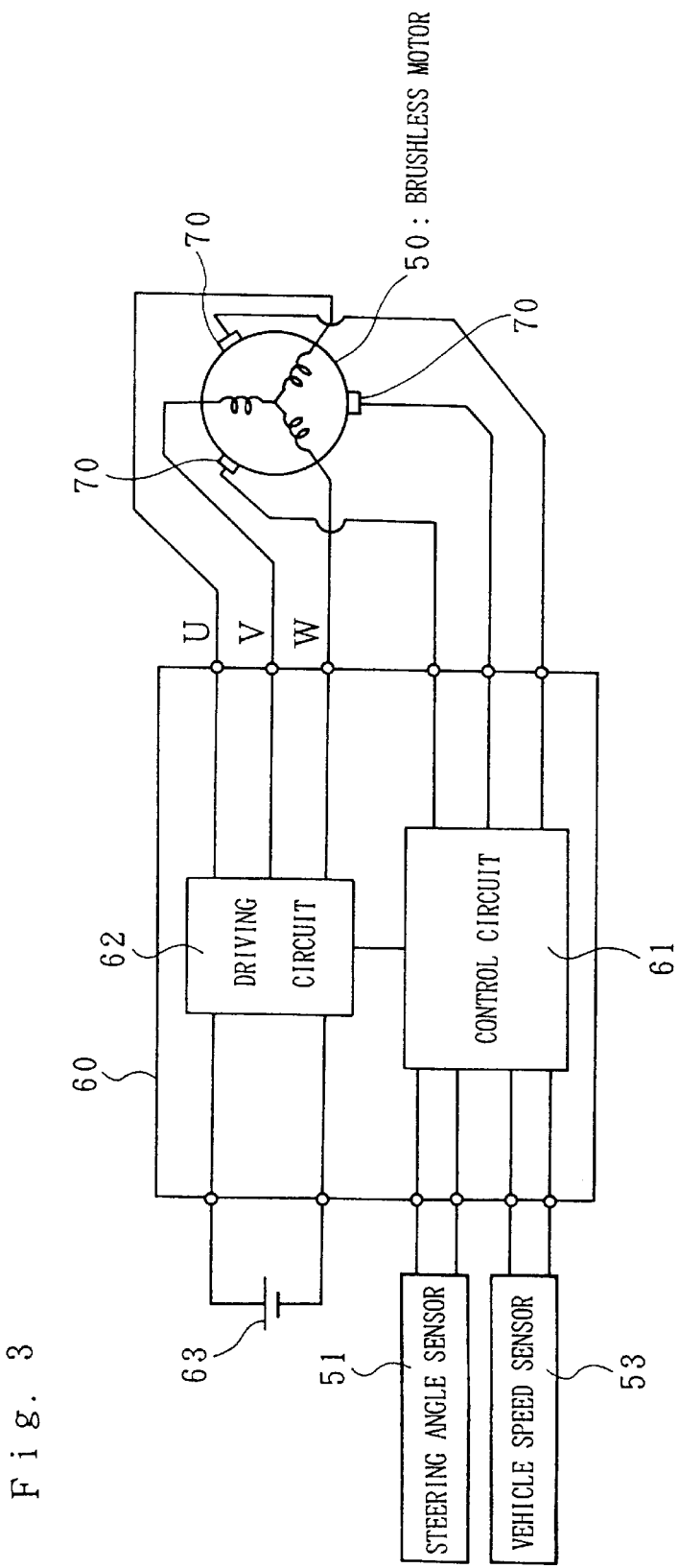
FIG. 3 is a block diagram for explanation of the controller of the power steering device of the embodiment of the present invention.

As illustrated in FIG. 1, the above-described brushless motor 50 is connected to a controller 60. As illustrated in FIG. 3, the controller 60 has a control circuit 61 and a driving circuit 62.

The control circuit 61 is configured mainly with a computer. The control circuit 61 is connected to sensors 70 for sensing the position of the rotor of the brushless motor 50, a steering angle sensor 51 for detecting the steering angle from the center of the steering angle range of the steering wheel H, and a vehicle speed sensor 53. The control circuit 61 transmits directional signals to the driving circuit 62 in accordance with a memorized control program.

The driving circuit 62 is connected to the stator coil of the above-described brushless motor 50 and a battery as a power source 63. The driving circuit 62 drives the brushless motor 50 by supplying an electric current, which corresponds to the directional signals from the control circuit 61, to the stator coil. This driving circuit 62 can be a known one including a transistor such as FET, which serves as a switching element for power control.

As illustrated in FIGS. 8 (1) and 8 (2), the housing 60a of the controller 60 is connected directly to the housing 50a of the motor 50. The housing 50a of the motor 50 is connected directly to the housing 37a of the pump 37. The housing 37a of the pump 37 is connected directly to the tank 41. The switching element 62a for power control, such as FET, which constitutes the driving circuit 62 of the controller 60, is in contact with the tank 41. Because the temperature of oil stored in the hydraulic fluid tank 41 in a power steering device is at most about 80 to 90° C., the heat generated by the switching element 62a can be released via the tank 41. This constitution makes it possible to prevent output reduction due to voltage drop in harnesses and connectors, when the driving circuit 62 and the control circuit 61 are incorporated in the same housing 60. Moreover, it is possible to prevent the control circuit 61 from being affected by the heat generated by the switching element 62a. The arrows shown in FIG. 8 (1) indicate the direction of oil discharge from the pump 37 and the direction of oil return to the tank 41.

Figure 4:
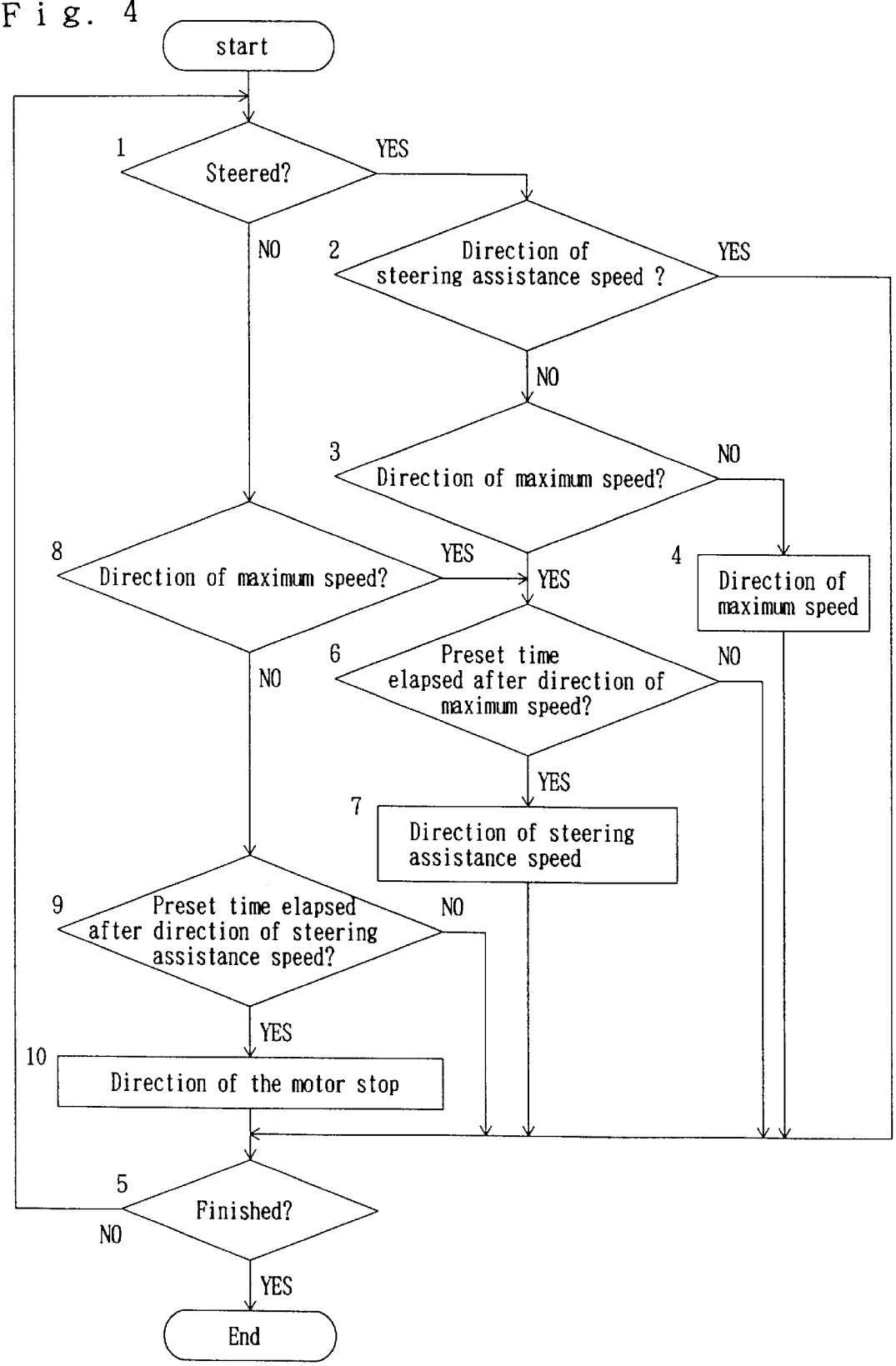
FIG. 4 is a flow chart showing the control procedure for the power steering device of the embodiment of the present invention.

Referring to the flow chart shown in FIG. 4, the procedure for control of the brushless motor 50 by the above-described control circuit 61 is described below.

First, the control circuit 61 judges whether or not the vehicle is steered (step 1). For example, a preset reference steering angle is memorized. The reference steering angle is, for example, a play angle from the center of the steering angle range of the steering wheel H. The steering angle of the steering wheel H is sensed by the above-described steering angle sensor 51. When the sensed steering angle is not smaller than the reference steering angle, the control circuit 61 judges that the vehicle is steered. When there is no change of the steering angle from the reference steering angle, or when a preset given time has elapsed after the steering angle is returned to the reference steering angle, the control circuit 61 judges that the vehicle is not steered.

Figure 5:
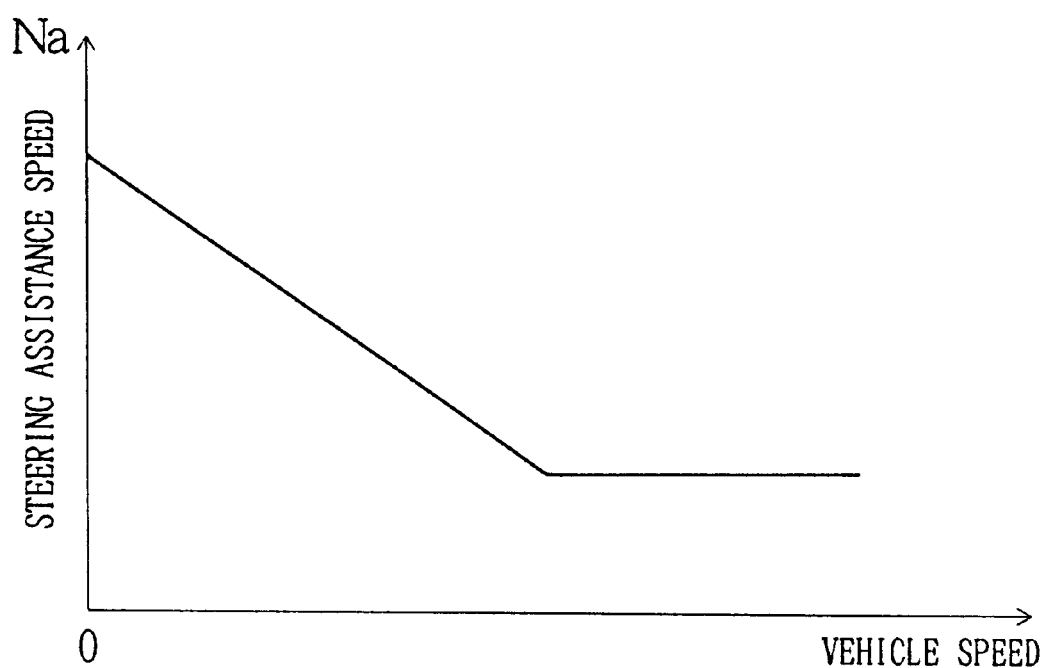
FIG. 5 is a graph showing the relation between the steering assistance speed of the brushless motor and vehicle speed in the power steering device of the embodiment of the present invention.

When the control circuit 61 judges in step 1 that the vehicle is steered, it then judges whether or not a directional signal to set the rotation speed of the brushless motor 50 to a steering assistance speed is being transmitted to the driving circuit 62 (step 2). The steering assistance speed is preset so that the flow rate of the hydraulic fluid fed from the above-described pump 37 becomes enough to generate steering assistance power. For example, as illustrated in FIG. 5, the steering assistance speed Na of the brushless motor 50 decreases according to vehicle speed until the vehicle speed reaches a preset value. Consequently, it is possible to improve the vehicle's maneuverability by increasing the steering assistance power at low vehicle speeds and to improve the vehicle's running stability by decreasing the steering assistance power at high vehicle speeds. The vehicle speed is sensed by the above-described vehicle speed sensor 53.

When no directional signals is being transmitted in step 2, the control circuit 61 judges whether or not a directional signal to maximize the rotation speed of the brushless motor 50 is being transmitted to the driving circuit 62 (step 3). The maximum speed of the brushless motor 50 is preset at a level exceeding the above-described steering assistance speed. Also, the maximum speed is changed according to the steering speed or steering torque variation. For example, as shown in FIG. 6 (1), the maximum speed Nmax of the brushless motor 50 increases according to the steering speed, and as shown in FIG. 6 (2), the maximum speed Nmax of the brushless motor 50 increases according to the steering torque variation. The steering speed can be determined from the change of the steering angle sensed by the above-described steering angle sensor 51 per unit time. When the maximum speed is changed according to the steering torque variation instead of the steering speed, the steering torque variation can be determined from the variation of the steering torque sensed by a know torque sensor, which is to be connected to the control circuit 61 instead of the steering angle sensor 51. For example, a torque sensor disclosed by Unexamined Japanese Patent Publication HEI No.8-145830 can be used to sense the steering torque.

When no directional signals is being transmitted in step 3, the control circuit 61 transmits a directional signal to the driving circuit 62 so as to increase the rotation speed of the brushless motor 50 to the maximum speed Nmax, on the basis of the signal from the sensor 70 for sensing the position of the rotor of the brushless motor 50 and the steering speed or steering torque variation (step 4). Upon receipt of the directional signal, the driving circuit 62 supplies an electric current to the stator coil of the brushless motor 50 to set the rotation speed to the maximum speed Nmax.

Next, the control circuit 61 judges whether or not this procedure is to be finished (step 5). For example, when the vehicle's ignition switch is turned off, the procedure is finished. When the procedure is not to be finished, it is returned to step 1.

When a directional signal is being transmitted in step 3, the control circuit 61 judges whether or not a preset time has elapsed after transmission of the directional signal (step 6). The preset time can be set on the basis of the time required for increasing the rotation speed of the brushless motor 50 from a standby speed to the maximum speed Nmax. The standby speed is a preset speed lower than the above-described steering assistance speed. Here, the standby speed is set to zero.

When the preset time has not elapsed in step 6, it is returned to step 5.

When the preset time has elapsed in step 6, the control circuit 61 transmits a directional signal to the driving circuit 62 so as to set the rotation speed of the brushless motor 50 to the steering assistance speed Na, on the basis of the signal from the sensor 70 for sensing the position of the rotor of the brushless motor 50 and the vehicle speed sensed by the vehicle speed sensor 53 (step 7), after which it is returned to step 5. Upon receipt of the directional signal, the driving circuit 62 supplies an electric current to the stator coil of the brushless motor 50 to set the rotation speed to the steering assistance speed Na.

When the directional signal to set the rotation speed of the brushless motor 50 to the steering assistance speed Na has been transmitted in step 2, it is returned to step 5.

When the control circuit 61 has judged in step 1 that the vehicle is not steered, it judges whether or not a directional signal to maximize the rotation speed of the brushless motor 50 is being transmitted to the driving circuit 62 (step 8).

When the directional signal is transmitted in step 8, it is returned to step 6.

When the directional signal is not being transmitted in step 8, the control circuit 61 judges whether or not a preset time has elapsed after the transmission of the directional signal to set the rotation speed of the brushless motor 50 to the steering assistance speed Na (step 9). The preset time can be set to a level longer than the time required for recovering from the torsional elastic deformation of the torsion bar 3, and also set to a level so that the excessive driving time of the pump 37 is as short as possible.

When the preset time has elapsed in step 9, the control circuit 61 transmits a directional signal to the driving circuit 62 so as to set the rotation speed of the brushless motor 50 to standby speed, i.e., zero (step 10), after which it is returned to step 5. Upon receipt of the signal, the driving circuit 62 stops the electric current supply to the brushless motor 50, whereby the steering assistance is released.

According to the above-described constitution, failures due to brush abrasion during long-term use can be prevented by driving the pump 37 by means of the brushless motor 50. Also, when the standby speed is zero or low, the time required for the change from the standby speed to the steering assistance speed is influenced by the magnitude of the inertial moment of the motor rotor. It is therefore possible to shorten the time required for the change from the standby speed to the steering assistance speed when a brushless motor is used as the pump-driving motor than when a DC motor having a brush is used. Consequently, the delay of the steering assistance and the deterioration of the steering feeling can be prevented and vehicle fuel consumption can be improved satisfactorily.

In addition, because the rotation speed of the brushless motor 50 is set to the steering assistance speed Na after being increased to the maximum speed Nmax exceeding the steering assistance speed Na at the steering assistance mode, the time required for increasing the flow rate of the hydraulic fluid fed from the pump 37 to a value enough to generate steering assistance power is shortened. Therefore, the delay of the steering assistance and the deterioration of the steering feeling can be prevented, and also vehicle fuel consumption can be improved.

Figure 7:
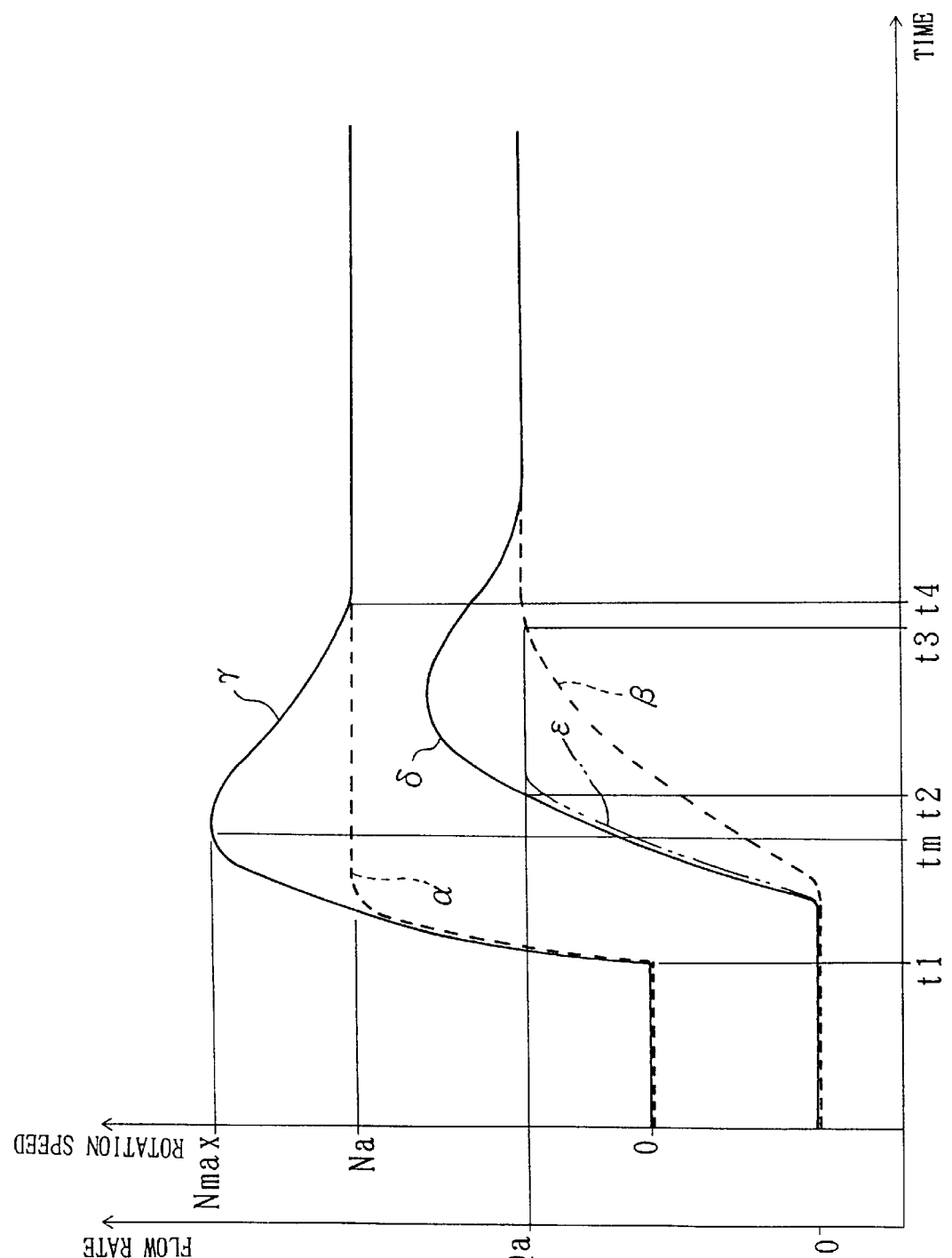
FIG. 7 is a graph showing the characteristics of the power steering device of the embodiment of the present invention.

For example, the dashed line a in FIG. 7 indicates the relation between time and rotation speed in the case wherein the rotation speed of the brushless motor 50 is set to the steering assistance speed Na without being increased to the maximum speed Nmax. The dashed line β indicates the relation between the flow rate of the hydraulic fluid fed from the pump 37 and time in this case. In this case, the motor rotation speed begins to be increased at time t1, and the flow rate of the hydraulic fluid fed from the pump 37 becomes a flow rate Qa enough to generate steering assistance power at time t3.

On the other hand, the solid line γ in FIG. 7 indicates the relation between time and rotation speed in the case wherein the rotation speed of the brushless motor 50 is set to the steering assistance speed Na after being increased to the maximum speed Nmax. The solid line δ indicates the relation between the flow rate of the hydraulic fluid fed from the pump 37 and time in this case. In this case, the rotation speed of the motor 50 begins to be increased at time t1, the rotation speed of the motor 50 becomes the maximum speed Nmax at time tm, the flow rate of the hydraulic fluid fed from the pump 37 becomes a flow rate Qa enough to generate steering assistance power at time t2, and the rotation speed of the motor 50 becomes the steering assistance speed Na at time t4.

In other words, the time required for increasing the flow rate of the hydraulic fluid fed from the pump 37 to a flow rate Qa enough to generate steering assistance power can be shortened by "t3−t2". Also, because the rotation speed is set to the steering assistance speed Na after being increased to the maximum speed Nmax, the flow rate of the hydraulic fluid for steering assistance does not increase in excess, whereby the deterioration of the vehicle fuel consumption can be prevented.

In FIG. 7, the pump 37 exhibiting the characteristics shown by the above-described dashed line β is a vane pump. In FIG. 7, the pump 37 exhibiting the characteristics shown by the two-dot chain line ε is a gear pump. The characteristics shown by the dashed line β and two-dot chain line ε are obtained when the characteristics of the motor 50 are shown by the above-described dashed line α. These characteristics demonstrate that the time required for increasing the discharge flow rate of the hydraulic fluid to a value enough to generate steering assistance power is shorter when a gear pump is used as the pump 37 than when a vane pump is used. In other words, in the case of a vane pump, hydraulic fluid is not discharged until the vanes for discharging hydraulic fluid is displaced radially outwardly by a centrifugal force after the driving shaft is driven by the motor 50. In contrast, in the case of a gear pump, hydraulic fluid is discharged upon driving of the driving shaft by the motor 50, because the gears for discharging hydraulic fluid is rotated simultaneously with the driving of the shaft. Therefore, the delay of the steering assistance and the deterioration of the steering feeling can be prevented. Furthermore, by using a gear pump as the pump 37 when the characteristics of the motor 50 are shown by the above-described solid line γ, the delay of the steering assistance and the deterioration of the steering feeling can be prevented more surely.

Also, by changing the maximum speed Nmax of the above-described brushless motor 50 according to the steering speed or the steering torque variation, the time required for increasing the flow rate of the hydraulic fluid fed from the pump 37 to a flow rate Qa enough to generate steering assistance power can be further shortened when the steering speed or the steering torque variation is large, i.e., when quick steering is performed. Therefore, the delay of the steering assistance and the deterioration of the steering feeling can be prevented. Also, when the steering speed is low, the flow rate of the hydraulic fluid for steering assistance does not increase in excess, whereby the deterioration of the vehicle fuel consumption can be prevented.

The present invention is not limited to the above-described embodiment. For example, the time "t4–tm" required for decreasing the rotation speed of the brushless motor 50 from the maximum speed Nmax to the steering assistance speed Na can be increased according to the steering speed or the steering torque variation, as shown in FIG. 6 (1) or FIG. 6 (2). The time "t4–tm" can be changed according to the preset time determined in step 6 above. By this constitution, the same effect can be obtained as that obtained when the maximum speed Nmax of the brushless motor 50 is changed according to the steering speed or the steering torque variation.

Figure 9:
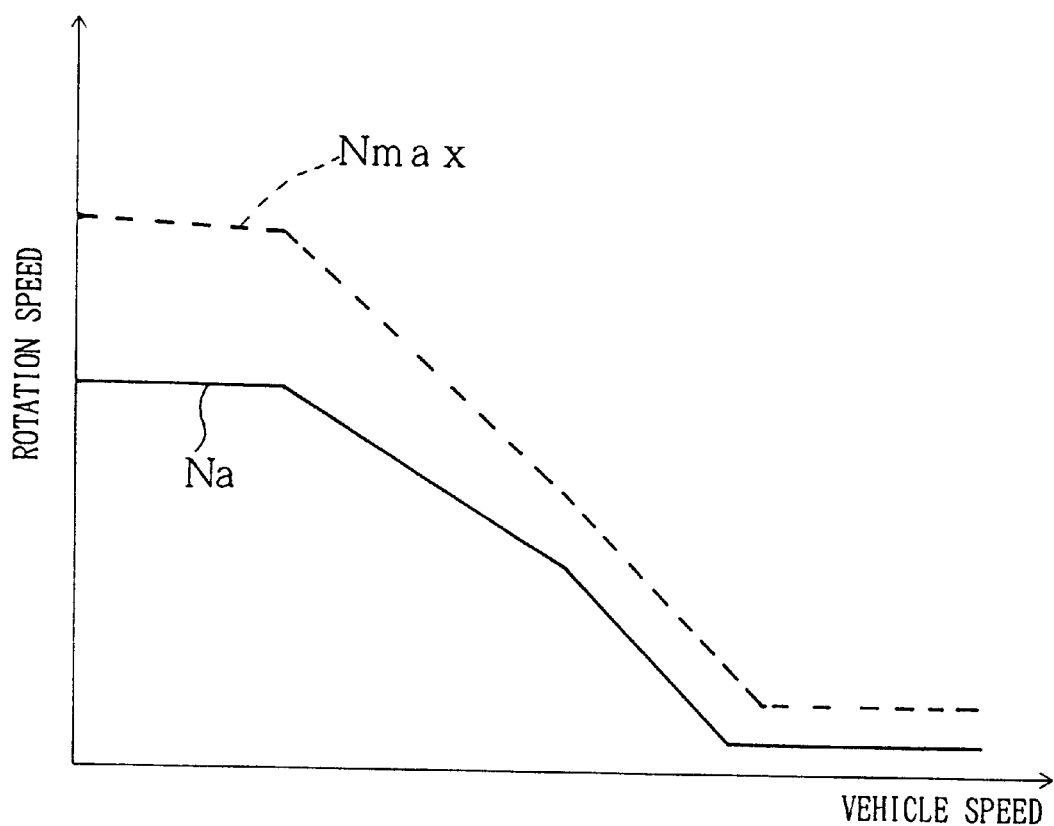
FIG. 9 is a graph showing the relation between the rotation speed of the brushless motor and vehicle speed in the power steering device of a modification of the present invention.

Also, it is preferable to decrease the maximum speed Nmax of the motor 50 according to the increase of the vehicle speed, when the steering assistance speed Na of the motor 50 is decreased according to the increase of the vehicle speed, as shown in FIG. 9. Consequently, the vehicle fuel consumption can be improved, because the maximum speed Nmax of the motor 50 can be as low as possible when it is intended to improve the vehicle's maneuverability at low vehicle speeds and the vehicle's running stability at high vehicle speeds.

Also, a torque sensor for detecting the steering torque can be used instead of the above-described steering angle sensor 51 so as to judge whether the vehicle is steered or not on the basis of the steering torque. For example, when the absolute value of the steering torque exceeds a preset value (e.g., 7 kgf·cm) corresponding to a value in a straight steering state, the control circuit judges that the vehicle is steered, and then drives the motor 50. When the absolute value of the steering torque is not higher than the preset value, the control circuit judges that the vehicle is not steered, and then stops the motor 50.

Figure 10:
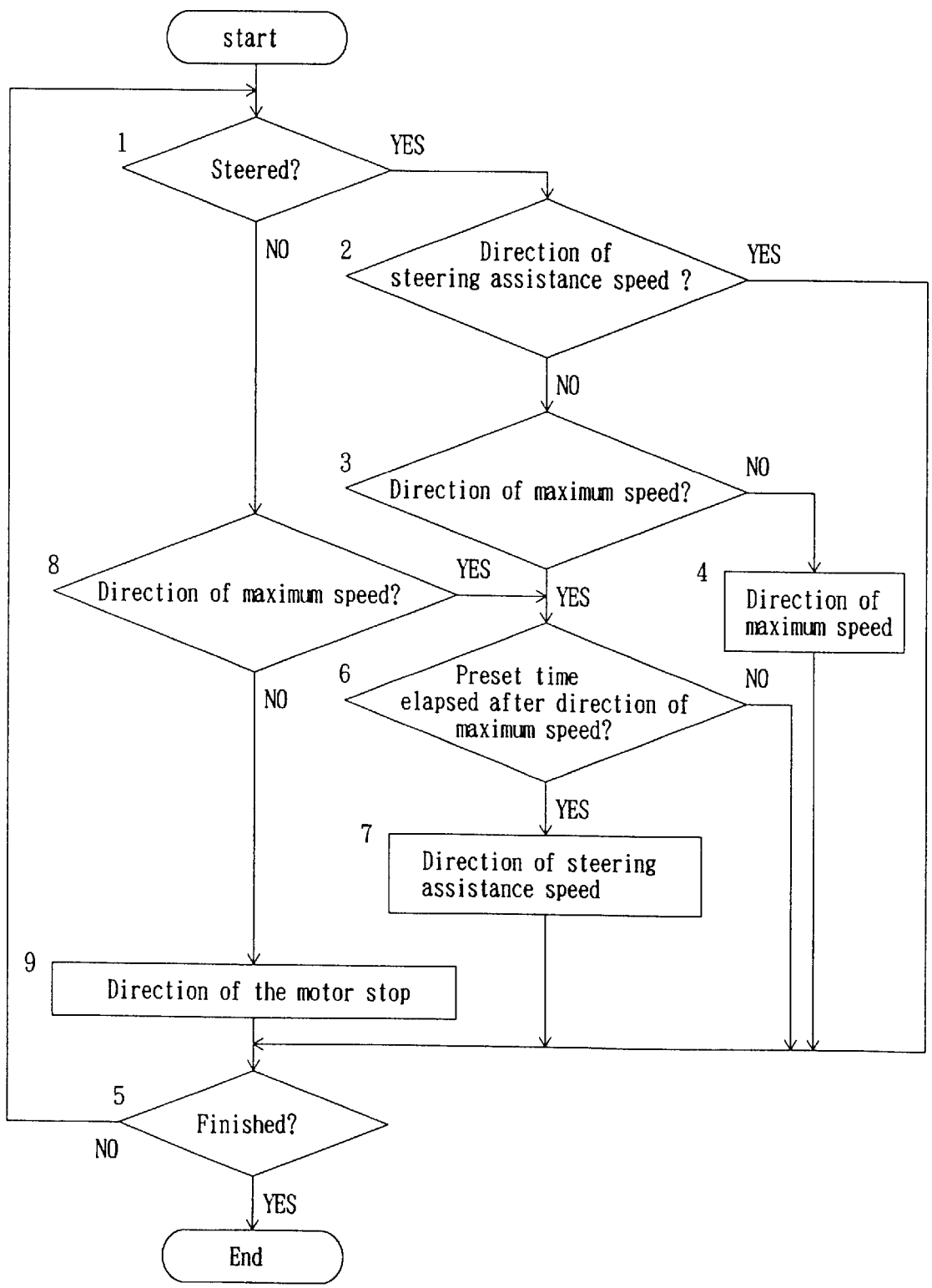
FIG. 10 is a flow chart showing the control procedure for the power steering device of a modification of the present invention.

In this modification, as shown in the flow chart of FIG. 10, when the control circuit judges in step 1 that the vehicle is not steered, on the basis of the signal from the torque sensor, a directional signal to set the rotation speed of the motor 50 to zero can be immediately transmitted in step 9, provided that a directional signal to maximize the rotation speed of the motor is not being transmitted in step 8. In other words, when the judgment of whether the vehicle is steered or not is performed on the basis of the steering angle as in the above-described embodiment, the change of the steering angle and the deformation of the torsion bar 3 do not always correspond to each other. For this reason, the directional signal to set the rotation speed of the motor 50 to zero cannot be transmitted unless a preset time has elapsed in step 9 of the flow chart in FIG. 4 after the judgement that the steering angle has returned to the straight running position. In contrast, according to this modification, the directional signal to set the rotation speed of the motor 50 to zero can be transmitted without judging whether or not the preset time has elapsed after the transmission of the directional signal to set the rotation speed of the motor 50 to the steering assistance speed Na. Therefore, it is possible to shorten the excessive time for driving the motor 50 and improve the vehicle fuel consumption. The other steps in the control procedure of the flow chart in FIG. 10 are the same as those in the above-described embodiment.

Also, even when the preset time has elapsed without change of the steering angle, steering at parking state, garaging, etc. are hampered in some cases wherein the control circuit judges that the vehicle is not steered. To be more precise, during steering at parking state, garaging, etc., the steering angle does not change in some cases wherein the steering wheel is held by the driver. When the steering angle does not change over the above-described preset time, the controller misjudges that the vehicle is not steered; the motor 50 is therefore stopped on the basis of the misjudgment. Consequently, the steering assistance power is eliminated, so that the steering wheel H rotates toward the straight running position by the elastic force of the above-described torsion bar 3. By this rotation of the steering wheel H, the steering angle changes. Upon changing of this steering angle, the motor 50 is again driven so that steering assistance power is added to the driver's steering effort. Consequently, the steering wheel H rotates away from the straight running position, so that the steering angle changes. Because the above serial action is repeated, the steering wheel H is oscillated. Therefore, there is a difficulty in retaining a constant steering angle, which in turn hampers steering at parking state, garaging, etc.

In contrast, when the judgment of whether the vehicle is steered or not is performed on the basis of the steering torque, the above-described problem does not arise. In other words, during steering at parking state, garaging, etc., the controller does not misjudges that the vehicle is not steered, because the steering torque is not decreased even when the steering wheel is held by the driver.

Also, the starting conditions and releasing conditions of the steering assistance are not subject to limitation. For example, the starting conditions can be satisfied when the angular steering speed exceeds a present value or when the winker is activated. The releasing conditions can be satisfied when the angular steering speed is lower than a preset value during a preset time. The present invention, applied to a rack-pinion type power steering device in the above-described embodiment, is also applicable to a ball-screw type power steering device, for instance.

What is claimed is:

1. A power steering device, comprising:
   a hydraulic actuator, which generates steering assistance power by using hydraulic fluid fed from a pump driven by a brushless electric motor; and means for controlling a rotation speed of the motor so that the rotation speed is set to:
1) a steering assistance speed in a steering assistance mode and
2) a standby speed in a steering assistance release mode;

wherein the rotation speed of the motor is set to the steering assistance speed after being set to a maximum speed that exceeds the steering assistance speed in the steering assistance mode.

2. The power steering device according to claim 1, further comprising:

means for decreasing the steering assistance speed of the motor according to an increase of the vehicle speed; and means for decreasing the maximum speed of the motor according to the increase of the vehicle speed.

3. The power steering device according to claim 2, wherein the standby speed is zero.

4. The power steering device according to claim 2, wherein a gear pump is used as the pump.

5. The power steering device according to claim 1, further comprising:

means for determining a steering speed or steering torque variation; and means for changing the maximum speed according to the steering speed or steering torque variation.

6. The power steering device according to claim 5, wherein the standby speed is zero.

7. The power steering device according to claim 5, wherein a gear pump is used as the pump.

8. The power steering device according to claim 1, further comprising:

means for determining a steering speed or steering torque variation; and means for changing the time required for decreasing the rotation speed of the motor from the maximum speed to the steering assistance speed according to the steering speed or steering torque variation.

9. The power steering device according to claim 8, wherein the standby speed is zero.

10. The power steering device according to claim 8, wherein a gear pump is used as the pump.

11. The power steering device according to claim 1, further comprising:

means for determining a steering speed or steering torque variation; and means for changing the maximum speed according to the steering speed or steering torque variation;

means for changing the time required for decreasing the rotation speed of the motor from the maximum speed to the steering assistance speed according to the steering speed or steering torque variation.

12. The power steering device according to claim 11, wherein the standby speed is zero.

13. The power steering device according to claim 11, wherein a gear pump is used as the pump.

14. The power steering device according to claim 1, wherein the standby speed is zero.

15. The power steering device according to claim 1, wherein a gear pump is used as the pump.

16. A power steering device, comprising:

a hydraulic actuator, which generates steering assistance power by using hydraulic fluid fed from a pump driven by an electric motor; and means for controlling the rotation speed of the motor so that the rotation speed is set to a steering assistance speed at a steering assistance mode and set to a standby speed at a steering assistance release mode;

wherein the rotation speed of the motor is set to the steering assistance speed after being set to a maximum speed exceeding the steering assistance speed at the steering assistance mode.

17. The power steering device according to claim 16, further comprising:

means for determining a steering speed or steering torque variation; and means for changing the maximum speed according to the steering speed or steering torque variation.

18. The power steering device according to claim 16, further comprising:

means for determining a steering speed or steering torque variation; and means for changing the time required for decreasing the rotation speed of the motor from the maximum speed to the steering assistance speed according to the steering speed or steering torque variation.

19. The power steering device according to claim 16, further comprising:

means for determining a steering speed or steering torque variation; and means for changing the maximum speed according to the steering speed or steering torque variation;

means for changing the time required for decreasing the rotation speed of the motor from the maximum speed to the steering assistance speed according to the steering speed or steering torque variation.

20. The power steering device according to claim 16, further comprising:

means for decreasing the steering assistance speed of the motor according to an increase of the vehicle speed; and means for decreasing the maximum speed of the motor according to the increase of the vehicle speed.

21. The power steering device according to claim 16, wherein a gear pump is used as the pump.

* * * * *